United States Patent
Beyh et al.

(10) Patent No.: US 11,095,501 B2
(45) Date of Patent: Aug. 17, 2021

(54) PROVISIONING AND ACTIVATING HARDWARE RESOURCES

(71) Applicant: HEWLETT PACKARD ENTERPRISE DEVELOPMENT LP, Houston, TX (US)

(72) Inventors: Yehia S. Beyh, Groton, MA (US); Fredrick M. Roeling, Fort Collins, CO (US); Jonathan Jay Lowe, Roseville, CA (US); Jagadish Vattigunta Reddy, Roseville, CA (US); Dharmendra Muthu, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 614 days.

(21) Appl. No.: 15/419,625

(22) Filed: Jan. 30, 2017

(65) Prior Publication Data

US 2018/0219728 A1    Aug. 2, 2018

(51) Int. Cl.
*H04L 12/24* (2006.01)
*H04L 12/26* (2006.01)

(52) U.S. Cl.
CPC ...... *H04L 41/0806* (2013.01); *H04L 43/0876* (2013.01); *H04L 43/16* (2013.01)

(58) Field of Classification Search
CPC . H04L 41/0806; H04L 43/0876; H04L 43/16; H04L 41/0843; H04L 41/0893; H04L 41/0896; H04L 41/50; H04L 41/5051; H04L 41/5054; H04L 41/5096; H04L 47/781; H04L 67/10; H04L 67/1097; H04L 67/34; G06F 2009/45562; G06F 2009/4557; G06F 2009/45591; G06F 2009/45595; G06F 3/067; G06F 8/60; G06F 8/61; G06F 9/45533; G06F 9/45558; G06F 9/5072; G06F 9/5077
USPC .......................................................... 709/220
See application file for complete search history.

(56) References Cited

U.S. PATENT DOCUMENTS

| 9,251,115 B2 | 2/2016 | Bursell |
| 9,385,918 B2 | 7/2016 | Civilini et al. |
| 2012/0246317 A1 | 9/2012 | Eriksson et al. |

(Continued)

FOREIGN PATENT DOCUMENTS

EP    2043320    12/2009

OTHER PUBLICATIONS

Subbaiah, K.et al., "Dynamic Resource Allocation Using Virtual Machines for Cloud Computing Environment", International Journal of Advanced Reasearch in Computer Science and Software Engineering, vol. 4, Issue 5, May 2014, 13 pages.

*Primary Examiner* — Christopher Biagini
(74) *Attorney, Agent, or Firm* — Hewlett Packard Enterprise Patent Department

(57) ABSTRACT

Examples relate to provisioning and activating hardware devices. In one example, a computing device may receive a request for a hardware resource; identify, in response to the request, a new hardware resource having hardware attributes indicating at least one capability of the new hardware resource; determine, based on the hardware attributes, a hardware template for provisioning the new hardware resource; configure the new hardware resource using the hardware template; and activate the new hardware resource in a cluster of at least one hardware device.

19 Claims, 4 Drawing Sheets

(56) References Cited

U.S. PATENT DOCUMENTS

| | | | |
|---|---|---|---|
| 2013/0346260 A1* | 12/2013 | Jubran | G06Q 10/087 |
| | | | 705/28 |
| 2014/0047095 A1* | 2/2014 | Breternitz | G06F 9/5072 |
| | | | 709/224 |
| 2015/0106520 A1 | 4/2015 | Breitgand et al. | |
| 2015/0263983 A1 | 9/2015 | Brennan et al. | |
| 2015/0334115 A1 | 11/2015 | Jenne | |
| 2016/0043968 A1* | 2/2016 | Jacob | H04L 47/808 |
| | | | 709/226 |

\* cited by examiner

PROVISIONING AND ACTIVATING HARDWARE RESOURCES

BACKGROUND

Computing systems often make use of multiple different types of computing devices for a variety of different purposes. For example, cloud computing system may include many server computers, network devices, and storage devices; an enterprise network may include the foregoing devices and also include personal computers. These systems are typically managed by one or more system administrators, who determine when to add devices to the computing systems and how to configure new devices in the computing systems.

BRIEF DESCRIPTION OF THE DRAWINGS

The following detailed description references the drawings, wherein.

DETAILED DESCRIPTION

Figure 1:
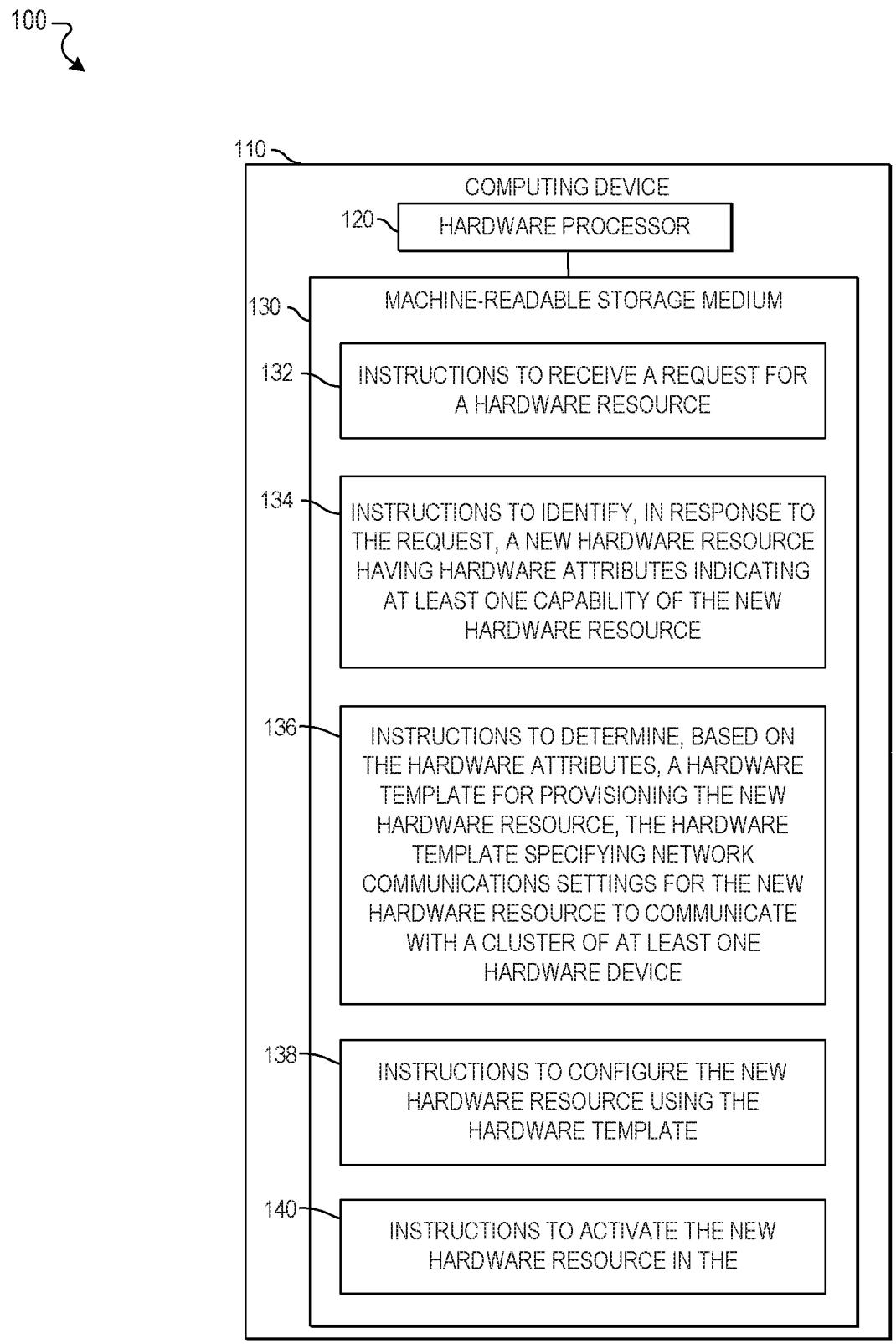
FIG. 1 is a block diagram of an example computing device for provisioning and activating hardware resources.

In situations where computing systems use multiple devices to perform computing tasks, a hardware resource management tool may facilitate the provisioning and activation of new hardware resources that are used by these systems, e.g., from small scale systems that make use of very few hardware resources to large scale systems that make use of hundreds or even thousands of underlying hardware resources. For example, a hardware deployment manager may facilitate the provisioning of the underlying hardware devices for a provider of cloud computing infrastructure. Aspects of the hardware deployment manager may include, in some implementations, discovery of new hardware resources and their capabilities, identifying hardware resources that may be provisioned in response to a request for a new hardware resource, configuring new hardware resources, and activating the new hardware resources into an active cluster of devices or into a new cluster of devices.

By way of example, a hardware deployment manager for a cloud computing environment may manage or have access to both active and inactive hardware resources. Active hardware resources may include, for example, compute servers and storage arrays that are currently deployed and operating in one or more clusters performing various applications. Inactive hardware resources, or available hardware resources, may include, for example, server computers and storage devices that are not currently active. The available hardware resources may be pooled and/or associated with various hardware attributes that specify capabilities of the hardware resources. Hardware attributes need not explicitly specify hardware capabilities, but may indicate capabilities through implication, e.g., a model number of a hardware device may not specify a capability, but a model number may be used to determine capabilities, such as CPU speed, GPU speed, storage capacity, RAM capacity, etc.

In a situation where the hardware deployment manager receives a request for a new compute server for a particular cloud computing cluster, the hardware deployment manager may use data associated with the request to identify one or more available hardware devices that could be provisioned/ activated in response to the request. For example, the request may be for a compute server with a GPU, and the hardware deployment manager may select a compute server from a pool of available server computers, e.g., one that was previously identified as having a GPU. The hardware deployment manager may then select a hardware template for the selected compute server, the hardware template specifying the manner in which the compute server should be configured and activated, e.g., operating system details, networking configuration, third party service configuration, and software configuration. The template chose may be based on the type of compute server requested, the type of server device selected for provisioning, the cluster into which the compute server will be activated, and/or based on data included in the request. In some implementations, user input may also be used to determine specific configuration details for configuring the compute server.

After selecting a template in the above example, and collecting any applicable input for configuration options, the hardware deployment manager may configure the new compute server using the template. The configuration of the new compute server may involve a variety of steps and details that may depend upon the template used. Configuration may include, for example, installing an operating system image file on the new compute server, configuring various operating system options, installing software on the new compute server, configuring the networking details of the compute server, and configuring the new compute server in a manner designed to allow it to communicate with third party devices. After configuring the new compute server, the hardware deployment manager may then provision the compute server, e.g., by activating the new compute server into a cloud computing system associated with the initial request. Further details regarding the provisioning of hardware resources are described in the paragraphs that follow.

Referring now to the drawings, FIG. 1 is a block diagram 100 of an example computing device 110 for provisioning hardware devices. Computing device 110 may be, for example, a personal computer, a server computer, cluster of computers, or any other similar electronic device capable of processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium 130. Hardware processor 120 may fetch, decode, and execute instructions, such as 132-140, to control processes for provisioning hardware devices. As an alternative or in addition to retrieving and executing instructions, hardware processor 120 may include one or more electronic circuits that include electronic components for performing the functionality of one or more instructions, e.g., a Field Programmable Gate Array (FPGA) or Application Specific Integrated Circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions 132-140, for provisioning hardware devices.

As shown in FIG. 1, the hardware processor 120 executes instructions 132 to receive a request for a hardware resource. By way of example, the request may be for a new compute server for operating virtual machines in a cloud computing system. The request may be received from a user or an application, e.g., through a separate user device or application operating on a separate device. Data included in the request may vary, and in some implementations the request may include information specifying hardware attributes or capabilities or other information that may be used to determine which hardware device(s) to provision, which template(s) to use, and the manner in which the device(s) are to be configured.

The hardware processor 120 executes instructions 134 to identify, in response to the request, a new hardware resource having hardware attributes indicating at least one capability of the new hardware resource. For example, in a situation where the request specifies a compute server, a server computer capable of being configured as a compute server may be identified from a pool of available server hardware. The attributes of the new server may be previously identified, e.g., using software and/or hardware that operates on the new hardware device(s) or a separate resource attribute discovery device. Hardware attributes may include any number of hardware features for the corresponding hardware devices, such as a hardware model, processor core count, RAM capacity, hypervisor type, graphical processing unit (GPU) type, local flash capacity, data storage capacity, data storage type, and/or network speed. As noted, hardware attributes need not explicitly specify hardware capabilities, but may indicate capabilities through implication, e.g., a model number of a hardware device may not specify a capability, but a model number may be used to determine capabilities, such as CPU speed, GPU speed, storage capacity, RAM capacity, etc.

The hardware processor 120 executes instructions 136 to determine, based on the hardware attributes, a hardware template for provisioning the new hardware resource. The hardware template specifies network communications settings for the new hardware resource to communicate with a cluster of at least one hardware device. Hardware templates generally specify the manner in which a new hardware resource is to be provisioned, e.g., into a cluster of cloud computing resources. A template may include, for example, one or more image files for installing software, such as an operating system software and software for interacting with third party services; a template may also include configuration details for the hardware and/or software, such as network configuration details for communicating with third party services and the cluster into which the new hardware resource is to be provisioned. Hardware templates may be stored in a database of templates and previously created, e.g., by a user or automatically based on prior hardware configurations.

The hardware processor 120 executes instructions 138 to configure the new hardware resource using the hardware template. The manner in which the new hardware resource is configured may vary depending on the hardware template used. For example, in some implementations, the new hardware resource is a compute server, and the computer server template may cause a hardware manager to configure the new compute server by deploying an operating system on the compute server, configuring the network settings of the compute server, identifying software based on details included in the initial new hardware request, and installing that identified software on the compute server. As another example, a storage array is another hardware device that may be configured, for example, by installing controller software in the storage array, formatting the storage array, configuring storage striping and/or mirroring, and configuring communications settings for the storage array.

In some implementations, the hardware processor 120 may use selective configuration options to configure a new hardware resource. Configuration options may be provided by a user or an application, and the configuration options may be provided with the initial request for the hardware resource and/or at another time. For example, after determining the hardware template to be used, feedback may be solicited from a requesting application or requesting user, the feedback specifying configuration options. E.g., a user interface may be displayed for a user, the user interface including various configuration options for the new hardware resource. The configuration options may include a variety of options, such as a hardware resource name, a cluster name, hardware resource security options, and shared storage selection. In situations where multiple new hardware resource are being provisioned and activated, configuration options may be provided for hardware resources individually or, in some implementations, configuration options may be used for all new hardware resources being provisioned and activated.

The hardware processor 120 executes instructions 140 to activate the new hardware resource in a cluster of at least one hardware device. The cluster may be used by a computing system to perform a variety of operations, e.g., as in the example of a compute cluster configured to process an application as part of a cloud computing system. In some implementations, activation includes creating a new cluster for use by a computing system. The new cluster may include one or more newly activated hardware resources. In some implementations, activation includes adding newly activated hardware resources to an existing cluster of hardware resources. Activation of new hardware resources may include providing communications to users and/or devices associated with the computing system that will make use of the new/updated cluster, e.g., in a manner designed to enable existing devices and users to make use of the new hardware devices activate in the new/updated cluster.

Figure 2:
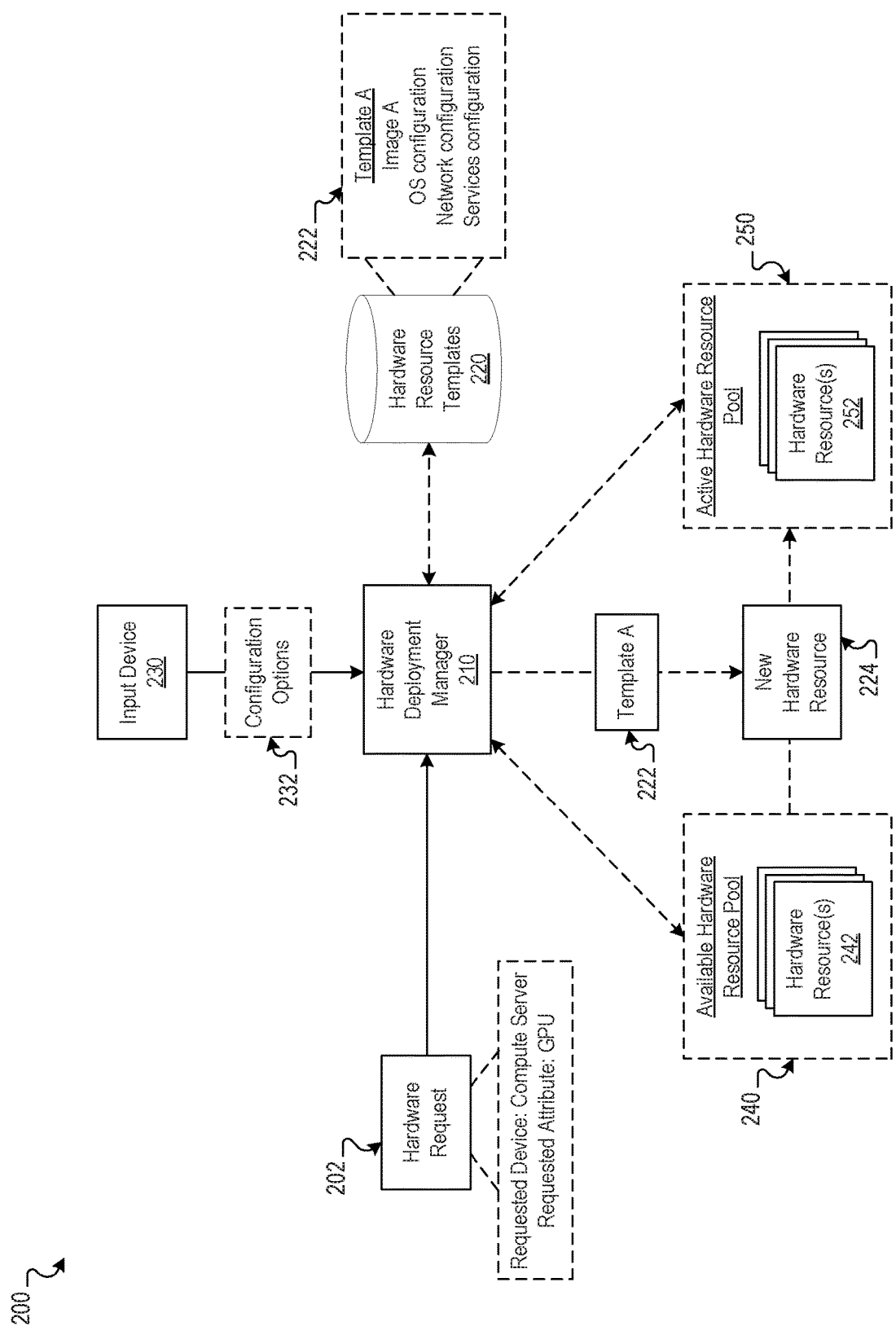
FIG. 2 is an example data flow depicting the provisioning and activation of hardware resources.

FIG. 2 is an example data flow 200 depicting the provisioning and activation of hardware resources. The example data flow 200 depicts several devices, including a hardware deployment manager 210, a hardware resource templates storage device 220, and a user device 230. The data flow 200 also includes pools of inactive hardware resources 240 and an active hardware resource pool 250. The hardware deployment manager 210 may be a computing device that is the same as or similar to the computing device 110 of FIG. 1. For example, the hardware deployment manager may be one or more computing devices capable of communicating with the other depicted devices, e.g., a hardware resource template data storage device 220, a user device 230, hardware resources 242 included in the inactive hardware resource pool 240, and hardware resources 252 included in the active hardware resource pool 250.

The hardware resources in the active and/or inactive resource pools may vary, and may include, for example, server computers, storage devices, and networking devices. The hardware resources 242 included in the available hardware resource pool 240 are generally inactive, e.g., not currently in use but available to be deployed in a computing environment. The hardware resources 252 in the active hardware resource pool 250 are currently performing operations in one or more systems, e.g., compute, storage, and network devices that make up one or more cloud computing systems.

During operation, the hardware deployment manager 210 receives a hardware request 202. In the example data flow 200, the hardware request 202 includes data regarding a requested device and a requested attribute, e.g., a compute server with a GPU. In some implementations, the hardware request 202 is provided by an application, e.g., an application monitoring active cloud computing system resources. In some implementations, the hardware request 202 may be provided by a user, e.g., a system administrator may send a request for a particular type of hardware to be added to a cloud computing system.

Using the data included in the hardware request, the hardware deployment manager 210 identifies a new hardware resource 224 from the hardware resources 242 included in the available hardware resource pool 240. In the example data flow 200, the new hardware resource 224 selected by the hardware deployment manager 210 may be, for example, a server computer that includes a GPU. In some implementations, the hardware deployment manager 210 may use user feedback to select a new hardware resource 224 from the available hardware resource pool 240. For example, in a situation where multiple compute servers with GPUs are available, the hardware deployment manager 210 may provide a user interface to an administrator, allowing the administrator to select which compute server(s) to deploy. The provided user interface may include additional information regarding the available hardware devices including, for example, hardware and software specifications and capabilities.

In the example data flow 200, the hardware deployment manager 210 also identifies a template 222 to use for provisioning the new hardware resource 224. A storage device for hardware resource templates 220 may include multiple templates that each specify the manner in which a hardware device is to be deployed. The example hardware template, template A 222, includes a device image file, as well as configuration data for an operating system, network, and services. Templates may have been previously configured by a user and/or generated by a computer, e.g., based on previously used and/or existing hardware device profiles.

In some implementations, such as in the example data flow 200, the hardware deployment manager 210 receives configuration options 232 from an input device 230. The configuration options 232 may be received from an application or a user, such as the application or user that provided the hardware request. Configuration options 232 may be provided in response to a request by the hardware deployment manager. In some implementations, the hardware deployment manager 210 may provide an interface for a third party, such a as a user or application, to provide configuration options 232. For example, the hardware deployment manager 210 may provide a user interface that specifies the new hardware resource 224 to be provisioned and activated, the current settings (such as those specified by the selected template), and additional options that may be configured, such as a name for the new hardware resource 224, a cluster into which the new hardware resource 224 should be added, additional devices the new hardware resource 224 should be configured to communicate with, or an identifier for a new cluster into which the new hardware resource 224 is to be activated.

Using the configuration options 232 and the example hardware template, template A 222, the hardware deployment manager 210 configures the new hardware resource 222. The template 222 may be applied in a variety of ways, depending on the data specified in the template 222. For example, to apply a hardware template for a compute server, the hardware deployment manager 210 may stream an image file specified by the template onto the compute server, causing the compute server to install an operating system. After installing an operating system on the compute server, additional configurations may be performed, such as configuring network settings to allow the compute server to operate in the computing system into which it will be deployed and installing/configuring software which may be used to perform its intended functionality within its destination computing system.

After configuring the new hardware resource 224, the hardware deployment manager 210 activates the new hardware resource 224, e.g., by activating it into an existing cluster of active hardware resources or by assigning it into a new cluster of hardware resources. In the example data flow, the active hardware resource pool 250 depicts multiple active hardware resources 252. Those resources may be included in a single cluster for one cloud computing system, or across multiple clusters for multiple cloud computing systems. Using the compute server example, a newly activated compute server may be added to an existing cluster, e.g., to support handling of increased application load for the target cloud system. As another example, the compute server may be assigned to a new cluster for performing a new application.

The operations described in the example data flow 200 may be performed independently of user input, e.g., they may be fully or partially automated. For example, in some situations the hardware request and configuration options may be provided by an application, such as an application currently running on a cloud computing system or an application that monitors a cloud computing system. In these situations, notifications may be provided to a user regarding hardware requests and the results of automatic activation.

Figure 3:
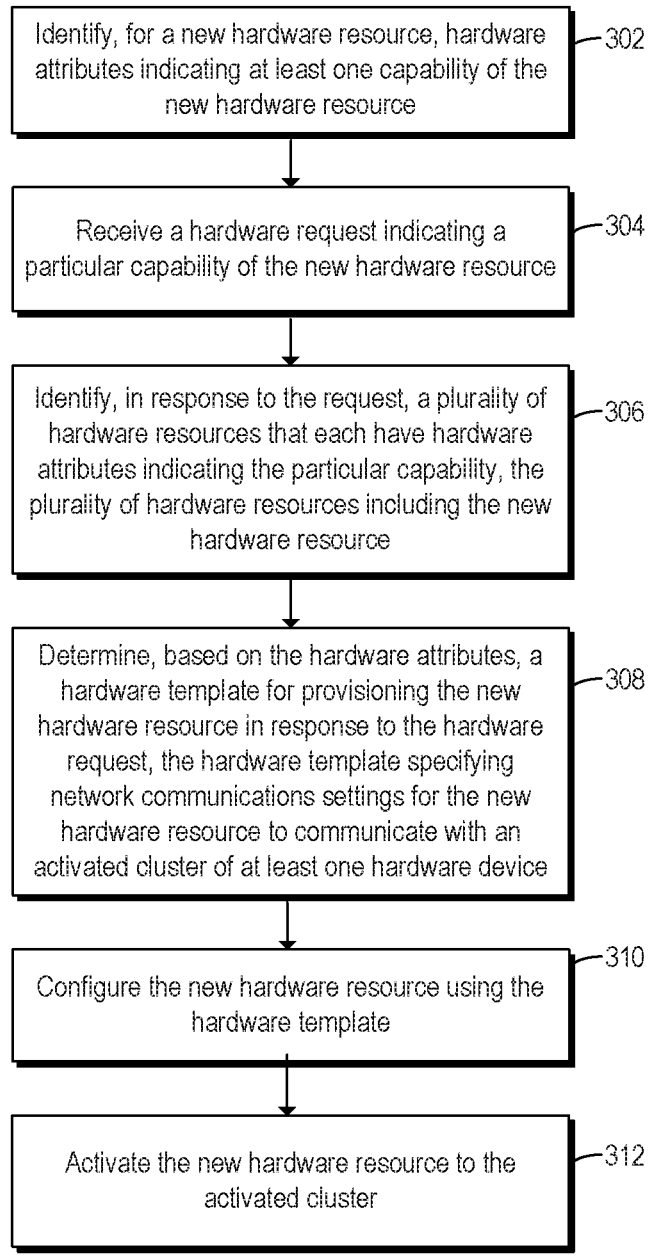
FIG. 3 is a flowchart of an example method for provisioning and activating hardware resources.

FIG. 3 is a flowchart of an example method 300 for provisioning and activating hardware resources. The method 300 may be performed by a computing device, such as the computing device described in FIG. 1 or the hardware deployment manager described with respect to FIG. 2. Other computing devices may also be used to execute method 300. Method 300 may be implemented in the form of executable instructions stored on a machine-readable storage medium, such as the storage medium 130, and/or in the form of electronic circuitry, such as an FPGA or ASIC.

For a new hardware resource, hardware attributes indicating at least one capability of the new hardware resource are identified (302). For example, in situations where a new server computer is added to a pool of available hardware resources, the server computer's hardware attributes may indicate that the server computer is capable of running a hypervisor to support multiple virtual machines and provide them with GPU access for graphically intensive applications.

A hardware request is received that indicates a particular capability of the new hardware resource (304). For example, a cloud system administrator may submit a request for a compute server with GPU functionality to support a cloud computing system with additional virtual machines. The capabilities included in the request may vary, and in some situations the hardware request may indicate the particular capabilities of multiple hardware resources. In some implementations, multiple pieces of hardware may be requested, each request indicating its own requested capabilities.

In response to the request, a plurality of hardware resources are identified that each have hardware attributes indicating the particular capability, the plurality of hardware resources including the new hardware resource (306). For example, the new server computer that was added to the pool of available resources may be identified, along with other server computers with GPU capabilities, based on their hardware attributes matching the requested capabilities.

Based on the hardware attributes, a hardware template is determined for provisioning the new hardware resource in response to the hardware request (308). The hardware template specifies network communications settings for the new hardware resource to communicate with an activated cluster of at least one hardware device. In some implementations, templates are associated with hardware attributes, and particular templates may be matches with certain hardware attributes or capabilities. As noted above, the templates specify the manner in which a hardware resource is to be configured when provisioned and activated into a cluster to be used in a computing system. In some implementations, the template to be used may be determined based on the capabilities included in the hardware request, e.g., the hardware request may specify hardware capabilities that include the ability to run a hypervisor that supports multiple virtual machines and makes use of a GPU. User input may also be used to determine a template; for example, a user may be presented with multiple templates to choose from, and the template to be used may be the one selected by the user.

The new hardware resource is configured using the hardware template (310). Configuration may include, for example, deploying an operating system on a compute server, configuring the network settings of the compute server, identifying software to be installed based on the initial hardware request, and installing the identified software on the computer. As another example, a storage node may be configured by using the hardware template to configure network settings of the storage node, format the storage node, and identify and install software on the storage node. Additional configuration may also occur. In some implementations, input may be received specifying one or more configuration options, and the configuration options may be used to configure the hardware resource. For example, a user and/or application may provide a cluster name, shared storage resources, and a server name for a new compute server.

The new hardware resource is added to an activated cluster of at least one hardware device (312). For example, the new compute server may be added to an existing cluster with other compute servers and other hardware devices that are actively supporting operations for a cloud computing system. As another example, a new cluster can be activated as a compute server, alone or with other new hardware resources, for performing a particular application or service in a cloud computing system.

While the example method 300 includes various actions that permit and facilitate user interaction, such as displaying data and receiving input, in some implementations, selection may be performed in whole or in part by a computer. For example, certain triggering events may cause automatic action to take place without user intervention. In this situation, notifications may be sent to a user to indicate actions that were taken. For example, in a situation where a compute server fails in a cloud computing network, a hardware deployment manager may receive an automated request to replace the failed compute server and, in response, select an available server computer from a pool of available devices and provision and activate that server computer as a compute node.

Figure 4:
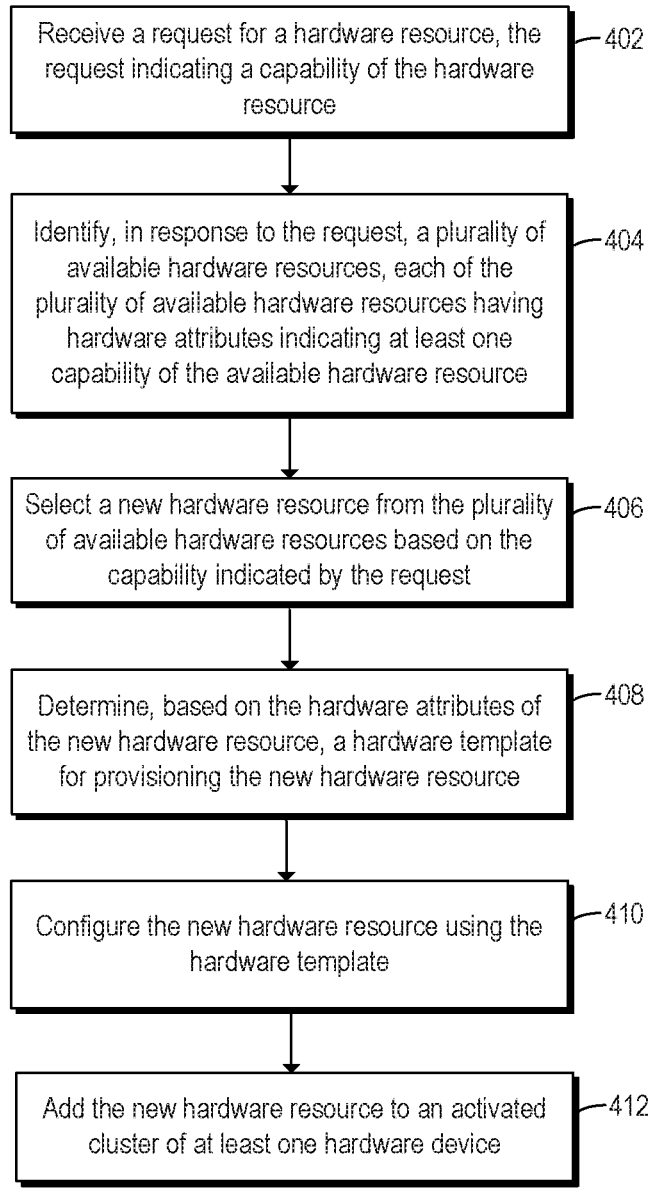
FIG. 4 is a flowchart of an example method for the provisioning and activation of hardware resources.

FIG. 4 is a flowchart of an example method 400 for the provisioning and activation of hardware resources. The method 400 may be performed by a computing device, such as a computing device described with respect to FIG. 1 or the hardware deployment manager described with respect to FIG. 2. Other computing devices may also be used to execute method 400. Method 400 may be implemented in the form of executable instructions stored on a machine-readable storage medium, such as the storage medium 130, and/or in the form of electronic circuitry, such as an FPGA or ASIC.

A request for a hardware resource is received, the request indicating a capability of the hardware resource (402). For example, a request may be received for a storage device that is capable of storing 10 TB of data. The request may have been provided by an application running on a cloud monitoring device in response to available storage space being below a threshold.

In response to the request, a plurality of available hardware resources may be identified, each of the plurality of available hardware resources having at least one capability of the available hardware resource (404). For example, multiple storage devices may be identified in response to the request. Each of the storage devices having at least one capability, e.g., storage capacity, storage speed, storage type, enclosure type, etc.

A new hardware resource is selected from the plurality of available hardware resources based on the capability indicated by the request (406). For example, multiple storage devices with various storage capacities may be available for provisioning, and one storage device that is capable of storing at least 10 TB of data may be selected. In situations where multiple devices have the capabilities specified by the request, one may be selected in a variety of ways, e.g., oldest device, newest device, device that most closely matches the requested capabilities, etc.

Based on the hardware attributes of the new hardware resource, a hardware template is determined for provisioning the new hardware resource (408). For example, the hardware attributes of the example storage device may include its capacity at 10 TB and its storage type as an array of ten 1 TB hard drives that operate at 7200 RPM speed. Other attributes may also be included. In some implementations, the purpose of the hardware device may be used to select a template. For example, the capabilities included in the hardware request may specify that the storage device is to be provisioned and activated as part of a RAID storage configuration for an existing storage array, and in this situation the capabilities may be used to determine the hardware template.

The new hardware resource is configured using the hardware template (410). For example, the storage array may be formatted as specified by the hardware template, and any additional communications configurations or controller configurations may be applied.

The new hardware resource is activated in a cluster of at least one hardware device (412). For example, the storage array may be activated as part of a cluster in an existing cloud computing system e.g., to satisfy a request for additional storage to be used by the cloud computing system.

Various portions of the methods 300 and 400 may be performed by one or multiple computing devices. For example, one computing device may be responsible for handling hardware request and identifying new hardware resources to provision and activate, and another computing device may be responsible for configuring and activating new hardware devices.

The foregoing disclosure describes a number of example implementations for provisioning and activating hardware devices. As detailed above, examples provide a mechanism for using hardware attributes to identify available resources and hardware templates for configuring and activating hardware resources for computing system.

We claim:

1. A computing device to manage hardware resources, the computing device comprising:
   a hardware processor; and
   a data storage device storing instructions that, when executed by the hardware processor, cause the hardware processor to:
      receive, from a user via a remote device, a request for a hardware resource;
      identify, in response to the request, an inactive hardware resource having hardware attributes indicating at least one capability of the inactive hardware resource, wherein the inactive hardware resource is not currently in use but available to be deployed in a computing environment;
      determine, based on the hardware attributes which are previously identified by hardware or software on the inactive hardware resource or by a separate resource attribute discovery device, a hardware template for provisioning the inactive hardware resource, the hardware template matching at least some of the hardware attributes of the inactive hardware resource and comprising an image file for installing one or more software files on the inactive hardware resource and configuration details specifying network communications settings for the inactive hardware resource to communicate with a cluster of at least one hardware device;
      receive input, from an application or a user, specifying at least one configuration option after the hardware template is determined based on the hardware attributes;
      configure the inactive hardware resource using the hardware template and the at least one configuration option; and
      activate the configured inactive hardware resource as an active hardware resource in the cluster.

2. The computing device of claim 1; wherein:
   the request specifies a hardware capability; and
   the inactive hardware resource is identified based on the hardware capability specified by the request.

3. The computing device of claim 2, wherein the inactive hardware resource is one of a plurality of hardware resources included in an inactive hardware resource pool.

4. The computing device of claim 1, wherein:
   the inactive hardware resource is a compute server; and
   the hardware template is a compute server template.

5. The computing device of claim 4, wherein the compute server is configured by using the hardware template to:
   deploy an operating system on the compute server;
   configure network settings of the compute server;
   identify software based on the request; and
   install the identified software on the compute server.

6. The computing device of claim 1, wherein:
   the request is received from the application; and
   the input is received from the application.

7. The computing device of claim 1, wherein the instructions further cause the hardware processor to:
   provide a user interface for receiving input from a user, the user interface including the at least one configuration option, and wherein:
   the request is received from a first user; and
   the input is provided by the first user through the user interface.

8. The computing device of claim 1, wherein the configured inactive hardware resource is activated by i) adding the inactive hardware resource to an existing cluster of hardware resources, or ii) creating a new cluster of hardware resources for the configured inactive hardware resource.

9. The computing device of claim 1, wherein the instructions further cause the hardware processor to determine the hardware template based on the hardware attributes and a purpose of the hardware resource indicated in the request.

10. The computing device of claim 9, wherein the purpose is to be part of a RAID storage configuration.

11. A method for managing hardware resources, implemented by a hardware processor, the method comprising:
    identifying, for an inactive hardware resource, hardware attributes indicating at least one capability of the inactive hardware resource;
    receiving, from a user via a remote device, a hardware request indicating a particular capability of the inactive hardware resource;
    identifying, in response to the request, a plurality of inactive hardware resources that each have hardware attributes indicating the particular capability, the plurality of inactive hardware resources including the inactive hardware resource, wherein the inactive hardware resource is not currently in use but available for deployment in a computing environment;
    determining, based on the hardware attributes which are previously identified by hardware or software on the inactive hardware resource or by a separate resource attribute discovery device, a hardware template for provisioning the inactive hardware resource in response to the hardware request, the hardware template matching at least some of the hardware attributes of the inactive hardware resource and comprising an image file for installing one or more software files on the inactive hardware resource and configuration details specifying network communications settings for the inactive hardware resource to communicate with an activated cluster of at least one hardware device;
    receiving input, from an application or a user, specifying at least one configuration option after the hardware template is determined based on the hardware attributes;
    configuring the inactive hardware resource using the hardware template and the at least one configuration option; and
    adding the inactive hardware resource as an active hardware resource to the activated cluster.

12. The method of claim 10, wherein:
    the request is received from the application; and
    the input is received from the application.

13. The method of claim 11, where the inactive hardware resource is a storage node; and
    the hardware template is a storage node template.

14. The method of claim 13, wherein the storage node is configured by using the hardware template to:
    configure network settings of the storage node;
    format the storage node;
    identify software based on the request; and
    install the identified software on the storage node.

15. A non-transitory computer readable medium including instructions that, when executed by a data processor, cause the data processor to perform operations comprising:
- receive, from a user via a remote device, a request for a hardware resource, the request indicating a capability of the hardware resource;
- identify, in response to the request, a plurality of available inactive hardware resources, each of the plurality of available inactive hardware resources having hardware attributes indicating at least one capability of the available inactive hardware resource, wherein the inactive hardware resource is not currently in use but available for deployment in a computing environment;
- select an inactive hardware resource from the plurality of available inactive hardware resources based on the capability indicated by the request;
- determine, based on the hardware attributes which are previously identified by hardware or software on the inactive hardware resource or by a separate resource attribute discovery device, a hardware template for provisioning the inactive hardware resource;
- receive input, from an application or a user, specifying at least one configuration option after the hardware template is determined based on the hardware attributes;
- configure the inactive hardware resource using the hardware template and the at least one configuration option, the hardware template matching at least some of the hardware attributes of the inactive hardware resource and comprising an image file for installing one or more software files on the inactive hardware resource and configuration details specifying network communications settings for the inactive hardware resource to communicate with a cluster of at least one hardware device; and
- activate the configured inactive hardware resource as an active hardware resource in the cluster.

16. The computer readable medium of claim 1, wherein:
the request is received from an application; and
the input is received from the application.

17. The computer readable medium of claim 15, wherein:
the inactive hardware resource is a compute server; and
the hardware template is a compute server template.

18. The computer readable medium of claim 17, wherein the compute server is configured by:
- deploying an operating system on the compute server;
- configuring network settings of the compute server;
- identifying software based on the request; and
- installing the identified software on the compute server.

19. The computer readable medium of claim 15, wherein:
the inactive hardware resource is a storage device; and
the hardware template is a storage device template.

* * * * *